Oct. 16, 1928.

G. L. PIERCE 1,687,634

CLEAT FOR SPORT SHOES

Filed Nov. 12, 1926

George L. Pierce, Inventor
By his Attorney Frank J. Kent

Patented Oct. 16, 1928.

1,687,634

UNITED STATES PATENT OFFICE.

GEORGE L. PIERCE, OF BROOKLYN, NEW YORK, ASSIGNOR TO A. G. SPALDING & BROS., OF NEW YORK, N. Y., A CORPORATION OF NEW JERSEY.

CLEAT FOR SPORT SHOES.

Application filed November 12, 1926. Serial No. 147,898.

This invention relates to a cleat and a means for securing the same to the soles of shoes for football and other sports, and has for its object the provision of a structure that will be sufficiently rugged to withstand the severe usage to which such cleats are subjected, and which at the same time is of neat appearance and capable of expeditious assembly.

While I have disclosed a preferred embodiment of the invention for purposes of illustration, it should be understood that various modifications may be made in the structure without departing from the spirit and scope of the invention as hereinafter set forth and claimed.

Figure 1:
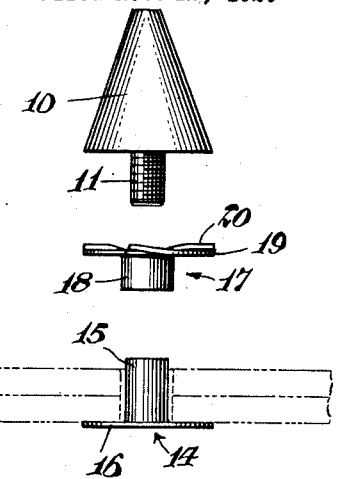
Fig. 1 is an exploded view showing the parts of the cleat assembly.
Figure 2:
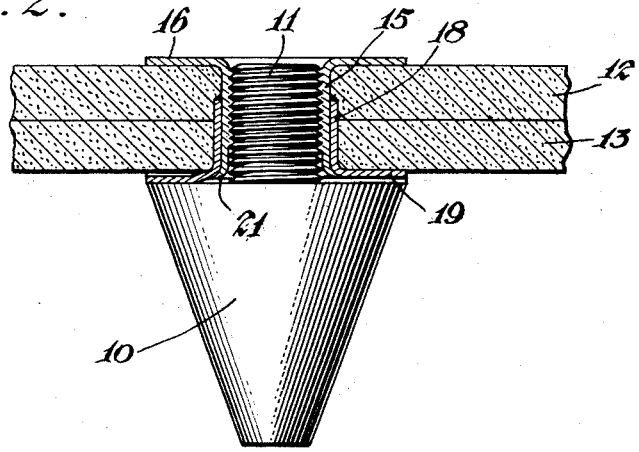
Fig. 2 is an enlarged elevation partly in section showing the parts in assembled position.
Figure 3:
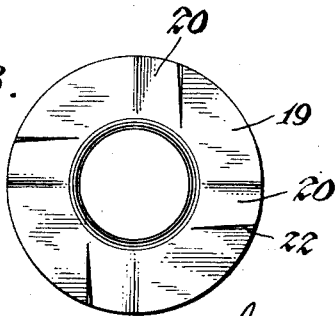
Fig. 3 is a plan of the lock washer used to prevent separation of the parts.

Referring to the drawings more specifically, the numeral 10 refers to the body of the cleat, which is of frusto-conical shape and is formed of leather, hard rubber or any other suitable material. A screw-threaded stem 11 projects from the center of the base of the cleat and provides means for securing the cleat to the sole of the shoe, which is composed of two layers of leather 12 and 13.

A bushing 14 is formed with a cylindrical body 15 and an annular flange 16, the interior of the cylindrical body 15 being formed with screw threads, except at the end farthest removed from the flange 16.

A second bushing 17 has a cylindrical body 18 of a size to fit around the body 15, and an annular flange 19 formed with radial locking teeth 20 struck upwardly from the flange.

The parts are assembled as follows: The screw bushing 14 is first inserted through an aperture formed through the sole layers 12 and 13, with its flange 16 abutting the inside of the sole. The second bushing 17 is then pushed over the body 15 of the screw bushing until its flange 19 abuts the outside of the sole. The upper end of body 15 is then riveted over the flange 19 as shown at 21, thereby securing the bushings in permanently assembled position on the sole of the shoe. The stem 11 of the cleat is now threaded into the screw threading from the outside of the sole until the base of the cleat contacts with the locking teeth 20. Upon further tightening the cleat the locking teeth bite into the cleat and the corresponding corners 22 are pressed into the leather of the sole so that the flange 19 acts as a lock washer to prevent the accidental loosening of the cleat while in service. It will be evident that while the cleat is firmly held in playing position it can be readily removed for replacement purposes by applying turning pressure to the cleat body.

I claim:

1. In a cleat for sport shoes, a sole member, an aperture formed in the sole member, a pair of bushings secured in the aperture, and a cleat member having a threaded stem engaging one of the bushings, the other bushing being formed to prevent accidental unscrewing of the cleat member.

2. In a cleat for sport shoes, a sole member, an aperture formed in the sole member, a flanged bushing inserted in the aperture and having an internally threaded cylindrical body, a second bushing having a body engaging over the body of the first bushing and held in place by an expanded part of the first bushing, and a cleat member having a threaded stem engaging the threaded body.

3. In a cleat for sport shoes, a sole member, an aperture formed in the sole member, a screw bushing inserted in the aperture, a second bushing extending over the screw bushing, part of the screw bushing being riveted over to hold the second bushing in place, and a cleat member having a threaded stem engaging the screw bushing.

4. In a cleat for sport shoes, a sole member, an aperture formed in the sole member, a screw bushing inserted in the aperture, a second bushing extending over the screw bushing, part of the screw bushing being riveted over to hold the second bushing in place, a cleat member having a threaded stem engaging the screw bushing, the second bushing being formed to prevent accidental unscrewing of the cleat member.

5. In a cleat for sport shoes, a sole member, an aperture formed in the sole member, a screw bushing inserted in the aperture and having a cylindrical body interiorly threaded for part of its length, said screw bushing also having a flange engaging the inner face of the sole, a second bushing having a body engaging over the cylindrical body of the screw bushing and having also a flange engaging the outer face of the sole and formed with locking teeth, the end of the body of the screw bushing being riveted over the flange of the second bushing, and a cleat member having a threaded stem cooperating with the interior threads of the screw bushing, the body of the cleat engaging the locking teeth of the second bushing.

6. In combination, a sole, a tubular bushing extending partway through the sole and having a flange engaging the outer face of the sole, a second tubular bushing extending within the first tubular bushing and having a flange engaging the inner face of the sole, the second bushing being permanently secured to the first bushing, the interior of the second bushing being screw-threaded, and a cleat having a threaded stem for engaging the threaded bushing, to secure the cleat detachably in position with its base overlying the outer flange.

In testimony whereof I affix my signature.

GEORGE L. PIERCE.